(12) United States Patent
Wei

(10) Patent No.: US 9,298,424 B2
(45) Date of Patent: Mar. 29, 2016

(54) RANDOM NUMBER GENERATING DEVICE

(71) Applicant: INNOSTOR TECHNOLOGY CORPORATION, Hsinchu County (TW)

(72) Inventor: Chih-Fan Wei, Hsinchu County (TW)

(73) Assignee: SK Hynix Inc., Gyeonggi-do (KR)

( * ) Notice: Subject to any disclaimer, the term of this patent is extended or adjusted under 35 U.S.C. 154(b) by 271 days.

(21) Appl. No.: 13/901,691

(22) Filed: May 24, 2013

(65) Prior Publication Data

US 2014/0351304 A1    Nov. 27, 2014

(51) Int. Cl.
    *G06F 7/58*    (2006.01)

(52) U.S. Cl.
    CPC ............... *G06F 7/588* (2013.01); *G06F 7/582* (2013.01)

(58) Field of Classification Search
    CPC ...................................................... G06F 7/582
    USPC ........................................ 708/250–256, 271
    See application file for complete search history.

(56) References Cited

U.S. PATENT DOCUMENTS

| 5,121,349 A * | 6/1992 | Naito .............................. 708/252 |
| 6,070,178 A * | 5/2000 | Anderson et al. .................. 708/3 |
| 7,860,912 B1 * | 12/2010 | Gyugyi et al. ................. 708/254 |
| 2004/0213407 A1 * | 10/2004 | Fujita et al. ....................... 380/46 |
| 2010/0057653 A1 * | 3/2010 | Wilber ............................. 706/22 |
| 2010/0281088 A1 | 11/2010 | Wilber |

FOREIGN PATENT DOCUMENTS

| CN | 1949708 | 4/2007 |
| TW | 554285 | 9/2003 |
| WO | WO 2013021028 A2 * | 2/2013 |

* cited by examiner

*Primary Examiner* — Andrew Caldwell
*Assistant Examiner* — Calvin M Brien
(74) *Attorney, Agent, or Firm* — William Park & Associates Ltd.

(57) ABSTRACT

A random number generating device is provided. The random number generating device includes a first frequency generating circuit, a second frequency generating circuit and a flip-flop. The first frequency generating circuit generates a first frequency signal according to a signal inputted via an input end, and outputs the first frequency signal via an output end. The second frequency generation circuit generates and outputs a clock signal. The flip-flop includes a data input end, a clock input end and a data output end. The data input end and the clock input end are electrically connected to the first frequency generating circuit and the second frequency generating circuit respectively. The flip-flop outputs a random signal via the data output end according to the first frequency signal and the clock signal, and feedbacks the random signal to the first frequency generating circuit to change frequency of the first frequency signal.

4 Claims, 7 Drawing Sheets

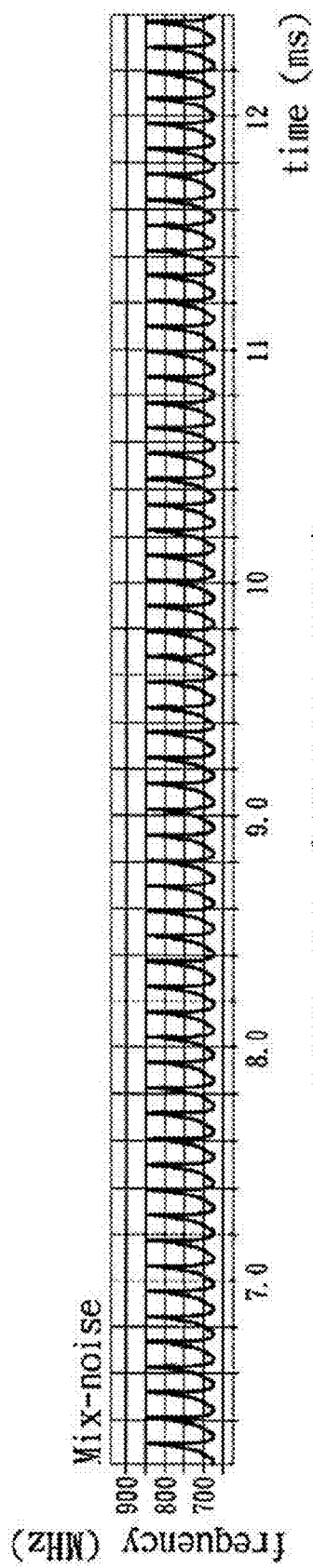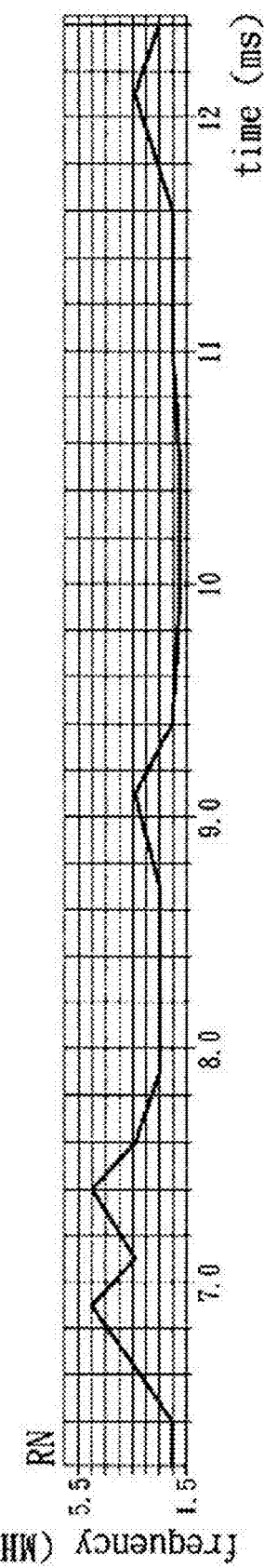
FIG. 2A (PRIOR ART)
FIG. 2B (PRIOR ART)

US 9,298,424 B2

RANDOM NUMBER GENERATING DEVICE

BACKGROUND

1. Technical Field

The present disclosure relates to a random number generating device, in particular, to a random number generating device making a generated random signal have white noise characteristic by feedback.

2. Description of Related Art

Referring to FIG. 1A, FIG. 1A is a functional block diagram illustrating a conventional random number generating device. As illustrated in FIG. 1A, the conventional random number generating device 9 primarily comprises a high frequency generator 90, a low frequency generator 92 and a D flip-flop 94. In practical operation, a random signal RN generated from the D flip-flop 94 is generated by accessing a high frequency signal NOISE_SIG generated from the high frequency generator 90 based on a clock signal CLK generated from the low frequency generator 92. However, since the clock signal CLK generated from the low frequency generator 92 is a stable low frequency signal, the characteristic of the random signal RN is determined by the characteristic of the high frequency signal NOISE_SIG.

For generating a set of random signals RN having diversity of die-to-die, referring to FIG. 1B. FIG. 1B is another functional block diagram illustrating a conventional random number generating device. As illustrated in FIG. 1B, the conventional random number generating device 9' comprises a high frequency generator 90, a first low frequency generator 96, a second low frequency generator 92, a D flip-flop 94 and a mixer 98. The random number generating device 9' generates a mixed signal Mix_noise by mixing a high frequency signal H_noise generated from the high frequency generator 90 and a low frequency signal L_noise generated from the first low frequency generator 96 via the mixer 98. Then, the D flip-flop 94 accesses the mixed signal Mix_noise based on a clock signal CLK generated from the second low frequency generator 92 and outputs the a random signal RN via an output end thereof.

Referring to FIG. 2A and FIG. 2B, FIG. 2A is a spectrum schematic diagram of a mixed signal in the random number generating device in FIG. 1B; FIG. 2B is a spectrum schematic diagram of a random signal in the random number generating device in FIG. 1B. As illustrated in FIG. 2A and FIG. 2B, the spectrum of the mixed signal Mix_noise still shows certain regularity so that the spectrum of the random signal RN also shows regularity with little variation. Therefore, although the random signal RN generated from the conventional random number generating device 9 meets the requirement for diversity of die-to-die, the random signal RN still cannot meet the requirement for white noise characteristic and diversity of time-to-time.

SUMMARY

A random number generating device is provided in the present disclosure. The random number generating device makes a random signal have white noise characteristic by a mechanism of feeding a random signal back to an input end of a high frequency generating circuit in the random number generating device.

An exemplary embodiment of the present disclosure provides a random number generating device. The random number generating device comprises a first frequency generating circuit, a second frequency generating circuit and a flip-flop. The first frequency generating circuit generates a first frequency signal according to a signal inputted via an input end of the first frequency generating circuit, and outputs the first frequency signal via an output end of the first frequency generating circuit. The second frequency generation circuit generates and outputs a clock signal. The flip-flop comprises a data input end, a clock input end and a data output end. The data input end and the clock input end are electrically connected to the output end of the first frequency generating circuit and the second frequency generating circuit respectively. The flip-flop outputs a random signal via the data output end according to the first frequency signal and the clock signal, and feedbacks the random signal to the input end of the first frequency generating circuit to change frequency of the first frequency signal. Frequency of the first frequency signal is higher than frequency of the clock signal.

To sum up, a random number generating device is provided in an exemplary embodiment of the present disclosure. The random number generating device makes a later generated random signal irrelevant to a previous generated random signal by a mechanism of feeding a random signal back to an input end of a high frequency generating circuit in the random number generating device so that the random signal generated from the random number generating device may have white noise characteristic. Accordingly, the random number generating device of the present disclosure can generate different random signals based on external environment factors (e.g. voltage and temperature) which are under intentional human control.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the scope of the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 2A is a spectrum schematic diagram of a mixed signal in the random number generating device in FIG. 1B.

FIG. 2B is a spectrum schematic diagram of a random signal in the random number generating device in FIG. 1B.

DESCRIPTION OF THE EXEMPLARY EMBODIMENTS

Figure 1A:
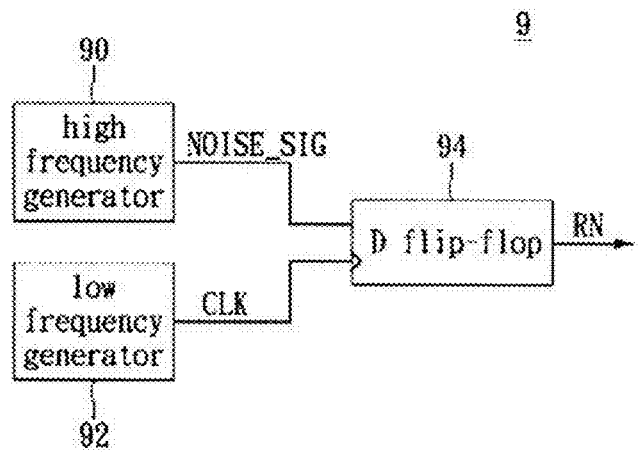
FIG. 1A is a functional block diagram illustrating a conventional random number generating device.
Figure 1B:
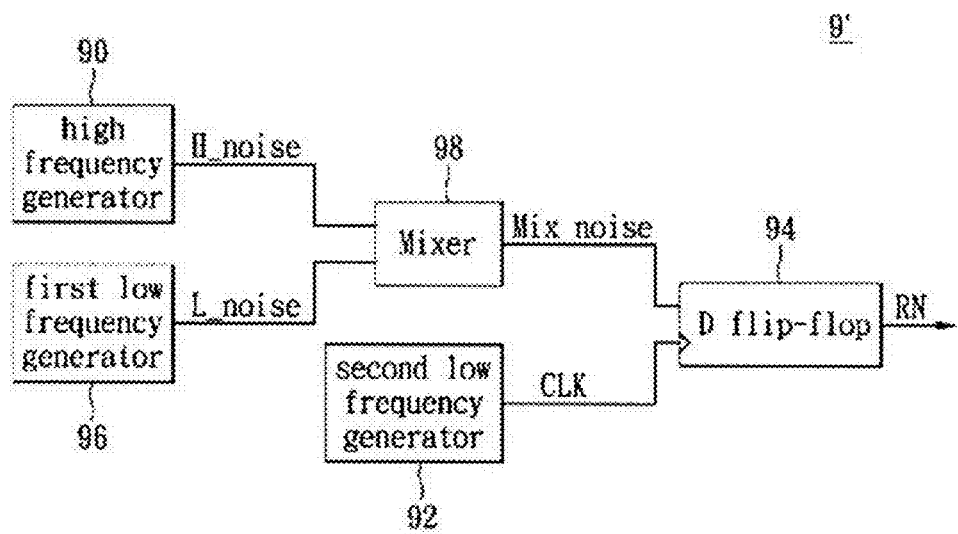
FIG. 1B is another functional block diagram illustrating a conventional random number generating device.
Figure 3:
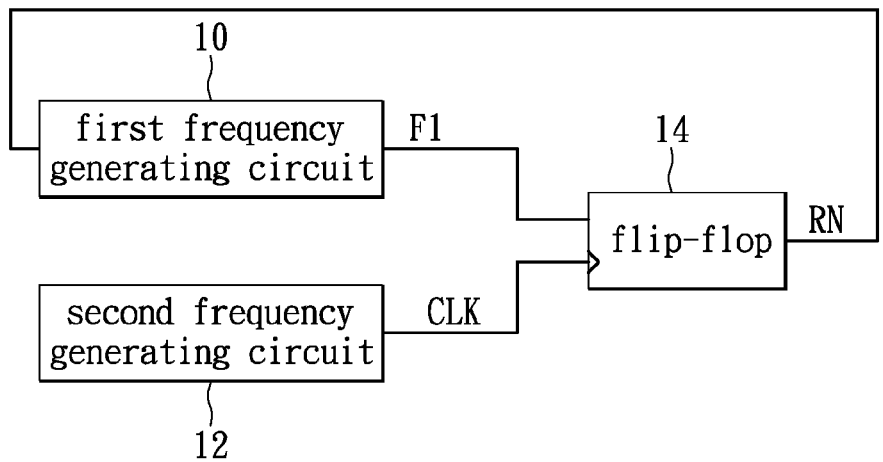
FIG. 3 is a functional block diagram illustrating a random number generating device in an embodiment of the present disclosure.

Referring to FIG. 3, FIG. 3 is a functional block diagram illustrating a random number generating device in an embodiment of the present disclosure. As illustrated in FIG. 3, the random number generating device 1 primarily comprises a first frequency generating circuit 10, a second frequency generating circuit 12 and a flip-flop 14. In an embodiment of the present disclosure, the flip-flop 14 comprises a data input end, a clock input end and a data output end. The data input end and the data output end of the flip-flop 14 are electrically connected to an output end and an input end of the first frequency generating circuit 10 respectively. The clock input end of the flip-flop 14 is electrically connected to the second frequency generating circuit 12. The detailed descriptions for each component of the random number generating device 1 will be described respectively thereinafter.

The first frequency generating circuit 10 generates a first frequency signal F1 according to an input signal (i.e., the random signal RN) inputted via the input end of the first frequency generating circuit 10 and outputs the first frequency signal F1 via the output end of the first frequency generating circuit 10. In practice, the first frequency generating circuit 10 is a high frequency generating circuit with unstable output frequency.

The second frequency generating circuit 12 is configured to generate and output a clock signal CLK. In practice, the second frequency generating circuit 12 is a low frequency generating circuit with stable output frequency. Such stable low frequency signal is ordinarily generated from a micro control unit (MCU) by dividing frequency, but the implementations are not intended to limit the scope of the present disclosure.

It should be noted that, the frequency of the first frequency signal F1 generated from the first frequency generating circuit 10 should be higher than the frequency of the clock signal CLK generated from the second frequency generating circuit 12. However, frequency bands of the first frequency signal F1 and the clock signal CLK are not intended to limit the scope of the present disclosure. For example, the frequency band can be a low frequency band between 30 KHz and 300 KHz, a middle frequency band between 300 KHz and 3 MHz or a high frequency band between 3 MHz and 30 MHz. Certainly, a person skilled in the art may use any frequency band from very low frequency band between 3 KHz and 30 KHz to super high frequency band between 3 GHz and 30 GHz depending on practical conditions. As long as the frequency of the first frequency signal F1 is higher than frequency of the clock signal CLK, it belongs to the scope of the present disclosure.

The flip-flop (i.e., trigger or bistable multivibrator) 14 outputs the random signal RN via the data output end of the flip-flop 14 according to the first frequency signal F1 and the clock signal CLK, and feedbacks the random signal RN to the input end of the first frequency generating circuit 10 to change frequency of the first frequency signal F1 after outputting the random signal RN. In practice, the flip-flop 14 can be a D flip-flop, a RS flip-flop, a T flip-flop or a JK flip-flop. The implementations of the flip-flop are not intended to limit the scope of the present disclosure.

In practical operation, a transmission path where the random signal RN being fed back to the first frequency generating circuit 10 is a positive feedback path. In other words, the random number generating device 1 of the present disclosure makes the random signal RN generated from the first frequency generating circuit 10 affect the first frequency signal F1 generated from the first frequency generating circuit 10 by positive feedback to cause variation of the random signal RN being increased so that the random signal RN may have white noise characteristic. In particular, when the random signal RN generated by feedback is a white noise, the samples extracted from any two different time of the random signal RN will be irrelevant (i.e., the autocorrelation coefficient of the random signal RN is substantially zero).

Figure 4:
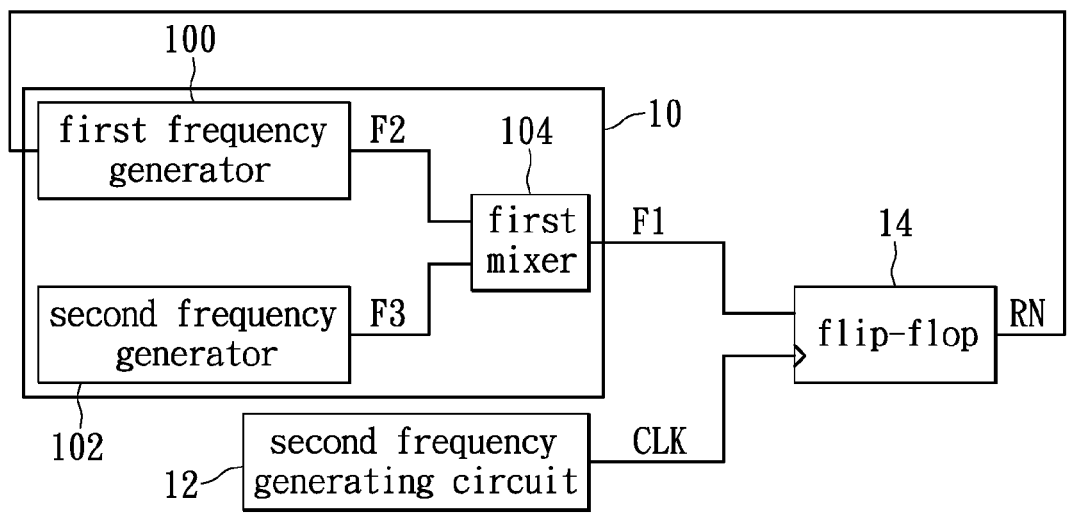
FIG. 4 is a functional block diagram illustrating a first frequency generating circuit of a random number generating device of the present disclosure.

Referring to FIG. 4, FIG. 4 is a functional block diagram illustrating a first frequency generating circuit of a random number generating device of the present disclosure. As illustrated in FIG. 4, the first frequency generating circuit 10 further comprises a first frequency generator 100, a second frequency generator 102 and a first mixer 104. The first frequency generator 100 and the second frequency generator 102 are electrically connected to the data input end of the flip-flop 14 via the first mixer 104.

In particular, the first frequency generator 100 is electrically connected between the data output end of the flip-flop 14 and one of the input ends of the first mixer 104. The other input end of the first mixer 104 is electrically connected to the second frequency generator 102. The output end of the first mixer 104 is electrically connected to the data input end of the flip-flop 14.

The first frequency generator 100 is configured to receive and selectively store the random signal RN indicating 1 or the random signal RN indicating 0, and generate and output a second frequency signal F2 according to the stored random signal RN. For example, if the first frequency generator 100 is pre-configured by a system to store the random signal RN indicating 1, the first frequency generator 100 will ignore (i.e., will not store) the random signal RN indicating 0 to make the generated second frequency signal F2 only relate to the random signal RN indicating 1 and increase the difference from the random signals RN currently and previously outputted from the data output end of the flip-flop 14.

In addition, source, format and quantity of the data stored by the first frequency generator 100 are not intended to limit the scope of the present disclosure. In other words, the data stored by the first frequency generator 100 can be data in the form of voltage or data in the form of digital code.

The second frequency generator 102 is configured to generate and output a third frequency signal F3. The generating means and the source of the third frequency signal F3 are not intended to limit the scope of the present disclosure.

The first mixer (i.e., wave mixer or frequency mixer) 104 is configured to mix the second frequency signal F2 and the third frequency signal F3 to generate the first frequency signal F1. Besides, although the first mixer 104 illustrated in FIG. 4 only mix the second frequency signal F2 and the third frequency signal F3, quantity of the signals which can be mixed by the mixer 104 is not intended to limit the scope of the present disclosure. In other words, the input end of the mixer 104 at least can receive the second frequency signal F2 and the third frequency signal F3 to generate the first frequency signal F1.

In practice, the mixer 104 is a logic gate circuit. For example, the mixer 104 can be an exclusive or (XOR) gate, exclusive nor (XNOR) gate or other logic gates. The implementations of the mixer 104 are not intended to limit the scope of the present disclosure. It should be noted that, the first frequency generator 100 may also store the random signal RN indicating 1 and the random signal RN indicating 0 respectively.

Figure 5A:
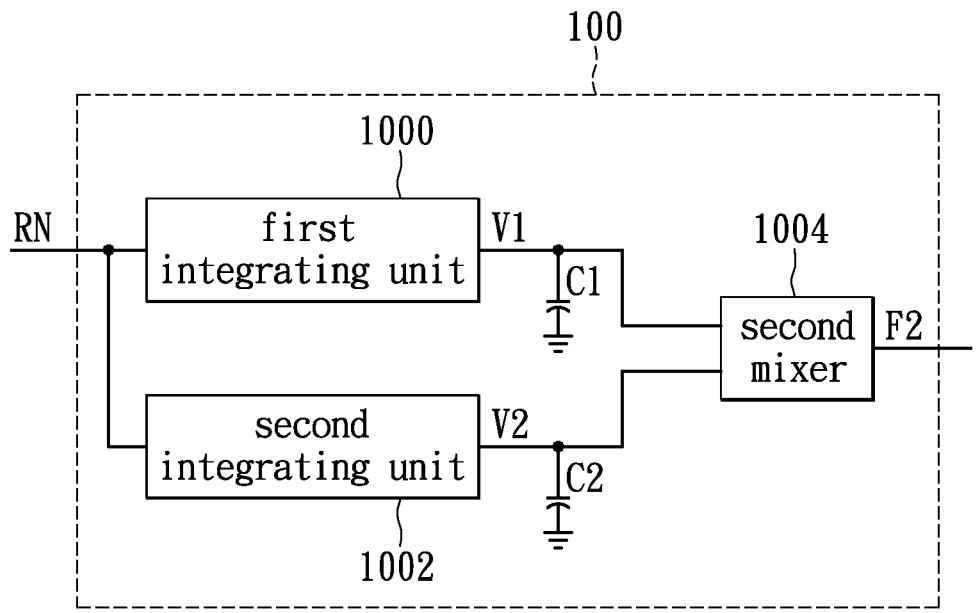
FIG. 5A is a detailed functional block diagram illustrating a first frequency generator of the present disclosure.

Referring to FIG. 4 and FIG. 5A in the meanwhile, FIG. 5A is a detailed functional block diagram illustrating a first frequency generator of the present disclosure. As illustrated in FIG. 5, the first frequency generator 100 comprises a first integrating unit 1000, a second integrating unit 1002, a second mixer 1004, a first capacitor C1 and a second capacitor C2. The input ends of the first integrating unit 1000 and the second integrating unit 1002 are electrically connected to the data output end of the flip-flop 14. The output ends of the first integrating unit 1000 and the second integrating unit 1002 are electrically connected to the input ends of the second mixer 1004. The first capacitor C1 and the second capacitor C2 are electrically connected between the first integrating unit 1000 and the second mixer 1004 and between the second integrating unit 1002 and the second mixer 1004 respectively. Additionally, the operations of the second mixer 1004 are similar to the above mentioned first mixer 104, and thus will not be further described herein.

The first integrating unit 1000 is configured to generate a first voltage signal V1 in response to the random signal RN indicating 1. The second integrating unit 1002 is configured to generate a second voltage signal V2 in response to the random signal RN indicating 0. In particular, the first integrating unit 1000 and the second integrating unit 1002 are configured to integrate the random signal RN indicating 1 and the random signal RN indicating 0 respectively, and transform the two integrated values into voltages, and store the voltages in the first capacitor C1 and the second capacitor C2.

The first capacitor C1 is configured to store electricity indicated by the first voltage signal V1 when the first frequency generator 100 is disabled, so as to provide initial frequency inputted to the second mixer 1004 when next time the first frequency generator 100 is enabled. The second capacitor C2 is configured to store electricity indicated by the second voltage signal V2 when the first frequency generator 100 is disabled, so as to provide initial frequency inputted to the second mixer 1004 when next time the first frequency generator 100 is enabled. In other words, since the first capacitor C1 and the second capacitor C2 keep the voltages stored last time when every time the first frequency generator 100 is disabled, the frequency generator 100 may have different initial frequencies when next time the frequency generator 100 is enabled, so that the second frequency signal F2 generated from the frequency generator 100 will be different every time.

Figure 6A:
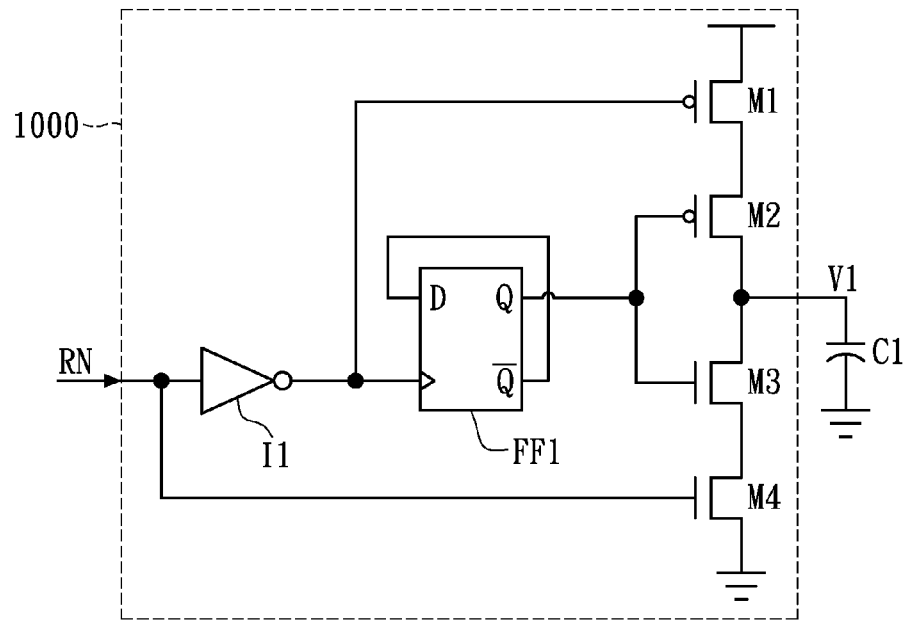
FIG. 6A is a schematic circuit diagram illustrating a first integrating unit of the present disclosure.
Figure 6B:
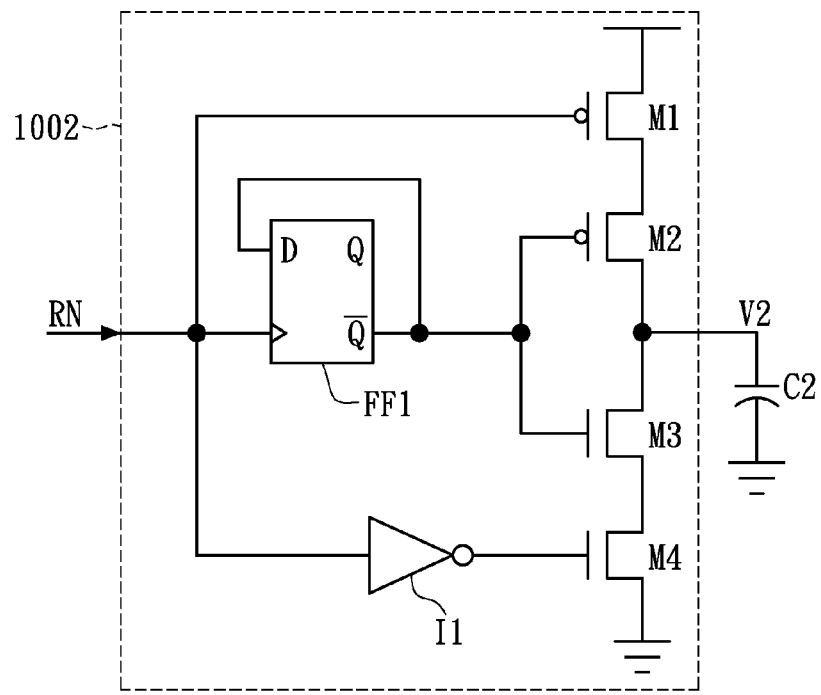
FIG. 6B is a schematic circuit diagram illustrating a second integrating unit of the present disclosure.

In order to clearly disclose the internal circuit design of the first integrating unit 1000 and the second integrating unit 1002, referring to FIG. 6A and FIG. 6B. FIG. 6A is a schematic circuit diagram illustrating a first integrating unit of the present disclosure. FIG. 6B is a schematic circuit diagram illustrating a second integrating unit of the present disclosure. As illustrated in FIG. 6A and FIG. 6B, both the first integrating unit 1000 and the second integrating unit 1002 comprise a D flip-flop FF1, an inverter I1 and four metal oxide semiconductor field effect transistor (MOSFET) M1, M2, M3 and M4. The first integrating unit 1000 and the second integrating unit 1002 are composed of the combination and the connection thereof.

Accordingly, the first integrating unit 1000 may only access the random signal RN indicating 1 and the second integrating unit 1002 may only access the random signal RN indicating 0. Then, the first integrating unit 1000 and the second integrating unit 1002 generate the first voltage signal V1 and the second voltage signal V2 respectively by accumulating the accessed random signal RN, and store them in the first capacitor C1 and the second capacitor C2 in the form of electricity. It should be noted that, the first integrating unit 1000 and the second integrating unit 1002 illustrated in FIG. 6A and FIG. 6B are merely one kind of circuit implementations, and are not intended to limit the scope of the present disclosure. A person skilled in the art may design an applicable circuit implementation depending on practical demands.

Figure 5B:
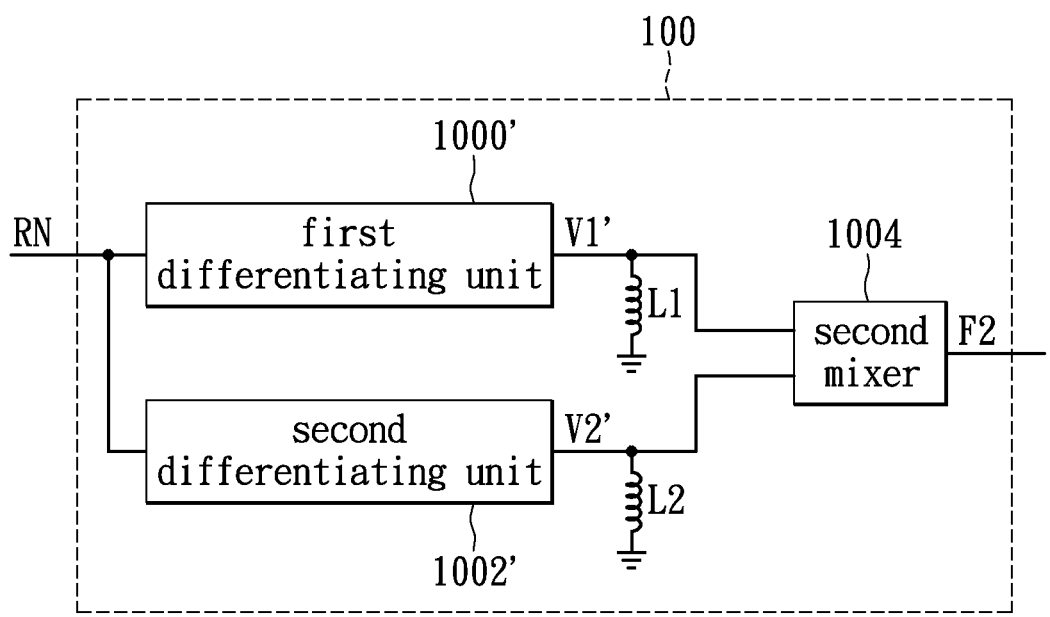
FIG. 5B is another detailed functional block diagram illustrating a first frequency generator of the present disclosure.

In addition, the implementations of the first integrating unit 1000 are not intended to limit the scope of the present disclosure as well. Referring to FIG. 5B, FIG. 5B is another detailed functional block diagram illustrating a first frequency generator of the present disclosure. As illustrated in FIG. 5B, the first frequency generator 100 comprises a first differentiating unit 1000', a second differentiating unit 1002', a second mixer 1004, a first inductor L1 and a second inductor L2. It should be noted that, the first differentiating unit 1000' and the second differentiating unit 1002' may further comprise a switch component (not shown in FIG. 5B) respectively for controlling the first inductor L1 and the second inductor L2 to store or release electricity. The operations of the other internal components in FIG. 5B are similar to the above descriptions for FIG. 5A, and thus will not be further described herein.

Figure 5C:
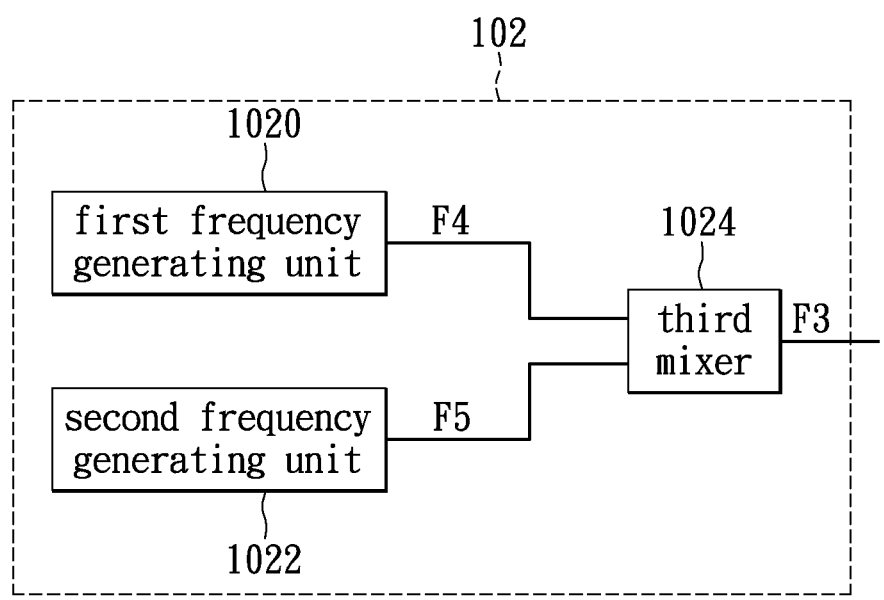
FIG. 5C is a detailed functional block diagram illustrating a second frequency generator of the present disclosure.

Referring to FIG. 5C, FIG. 5C is a detailed functional block diagram illustrating a second frequency generator of the present disclosure. As illustrated in FIG. 5C, the second frequency generator 102 primarily comprises a first frequency generating unit 1020, a second frequency generating unit 1022 and a third mixer 1024. The first frequency generating unit 1020 and the second frequency generating unit 1022 are electrically connected to the input ends of the third mixer 1024. The output end of the third mixer 1024 is electrically connected to one of the input ends of the first mixer 104.

The first frequency generating unit 1020 is configured to generate and output a fourth frequency signal F4. The second frequency generating unit 1022 is configured to generate and output a fifth frequency signal F5. In general, frequency of the fourth frequency signal F4 is higher than frequency of the fifth frequency signal F5, but source and frequency range of the fourth frequency signal F4 and the fifth frequency signal F5 are not intended to limit the scope of the present disclosure. The third mixer 1024 generates the third frequency signal F3 according to the received fourth frequency signal F4 and the received fifth frequency signal F5.

Figure 7A:
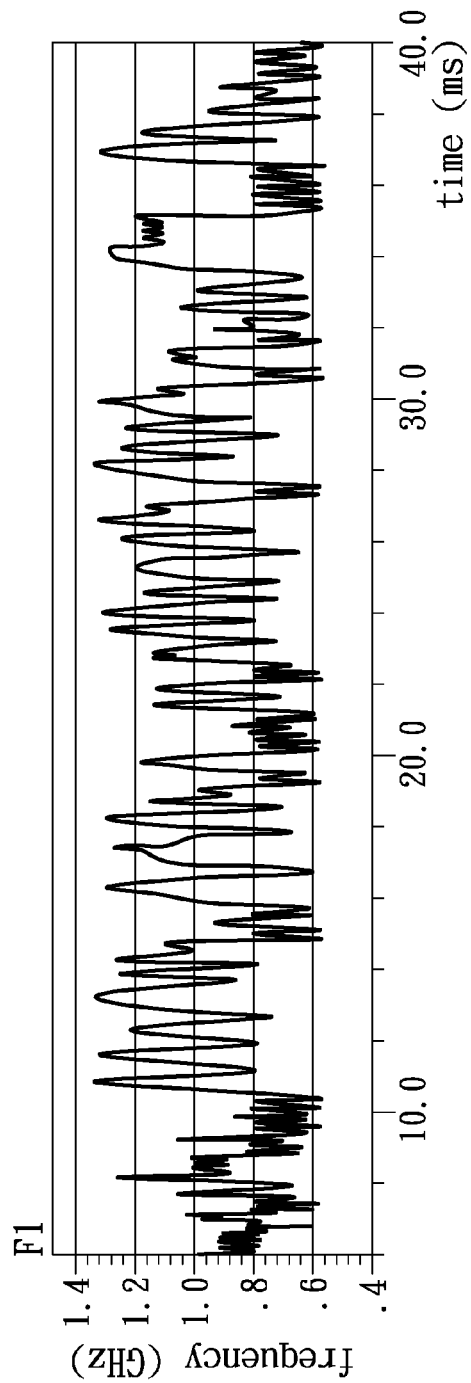
FIG. 7A is a spectrum schematic diagram of a first frequency signal in a random number generating device of the present disclosure.
Figure 7B:
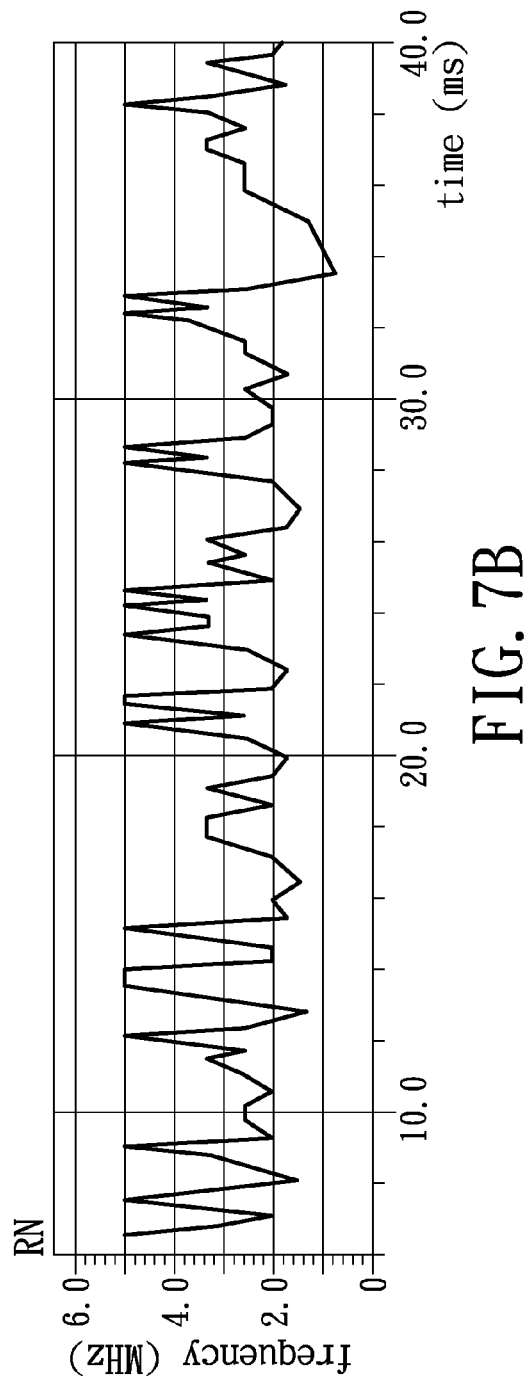
FIG. 7B is a spectrum schematic diagram of a random signal in a random number generating device of the present disclosure.

Accordingly, an accumulating positive feedback random number generating device with capacitive storage can be formed based on FIG. 4 and by applying the first frequency generator 100 in FIG. 5A and the second frequency generator 102 in FIG. 5C into FIG. 4 respectively. The accumulating positive feedback random number generating device with capacitive storage can make the outputted random signal RN have white noise characteristic via positive feedback mechanism. Referring to FIG. 7A and FIG. 7B, FIG. 7A is a spectrum schematic diagram of a first frequency signal in a random number generating device of the present disclosure; FIG. 7B is a spectrum schematic diagram of a random signal in a random number generating device of the present disclosure.

As illustrated in FIG. 7A and FIG. 7B, it can be evidently observed that the first frequency signal F1 and the random signal RN are not showing the characteristic of stable frequency variation. In other words, the spectrum of the first frequency signal F1 generated by positive feedback shows white noise characteristic so that the random signal RN generated from the flip-flop 14 has white noise characteristic as well.

In addition, the accumulating positive feedback random number generating device with capacitive storage makes the first frequency generator 100 have different initial frequencies when every time it is enabled, so that the generated random signal RN may have the advantage of diversity of time-to-time.

Moreover, the random number generating device 1 of the present disclosure may further access the data during the power rising time when every time the power is turned on to store different initial voltages in the first capacitor C1 and the second capacitor C2 or in the first inductor L1 and the second inductor L2.

According to the above descriptions, a random number generating device is provided in an embodiment of the present disclosure. The random number generating device makes a later generated random signal irrelevant to a previous generated random signal by a mechanism of feeding an outputted random signal back to an input end of the high frequency generating circuit in the random number generating device, so that the random signal generated from the random number generating device may have white noise characteristic. Besides, the random number generating device of the present disclosure further has different initial frequencies when every time it is enabled by a mechanism of storing voltages via capacitors, so that the random signal generated from the random number generating device may have the advantage of diversity of time-to-time. Accordingly, the random number generating device of the present disclosure can generate different random signals based on external environment factors (e.g. voltage and temperature) which are under intentional human control and has utility due to simple circuit implementations.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A random number generating device, comprising:
   a first frequency generating circuit, generating a first frequency signal according to a signal inputted via an input end of the first frequency generating circuit and outputting the first frequency signal via an output end of the first frequency generating circuit;
   a second frequency generating circuit, generating and outputting a clock signal; and
   a flip-flop, comprising a data input end, a clock input end and a data output end; the data input end and the clock input end are electrically connected to the output end of the first frequency generating circuit and the second frequency generating circuit respectively; the flip-flop outputs a random signal via the data output end according to the first frequency signal and the clock signal and feeds back the random signal to the input end of the first frequency generating circuit to change frequency of the first frequency signal;
   wherein frequency of the first frequency signal is higher than frequency of the clock signal,
   wherein the first frequency generating circuit further comprises:
   a first frequency generator, electrically connected to the data output end, being configured to receive and selectively store the random signal indicating 1 or the random signal indicating 0, and generate and output a second frequency signal according to the stored random signal;
   a second frequency generator, generating and outputting a third frequency signal; and
   a first mixer, wherein input ends of the first mixer receive at least the second frequency signal and the third frequency signal for generating the first frequency signal,
   wherein the first frequency generator further comprises:
      a first unit, generating a first voltage signal in response to the random signal indicating 1;
      a second unit, generating a second voltage signal in response to the random signal indicating 0;
      a second mixer, wherein input ends of the second mixer receive at least the first voltage signal and the second voltage signal, and an output end of the mixer is electrically connected to one of the input ends of the first mixer;
      a first capacitor, electrically connected between the first unit and the second mixer, being configured to store electricity indicated by the first voltage signal when the first frequency generator is disabled, so as to provide initial frequency inputted to the second mixer when next time the first frequency generator is enabled; and
      a second capacitor, electrically connected between the second unit and the second mixer, being configured to store electricity indicated by the second voltage signal when the first frequency generator is disabled, so as to provide initial frequency inputted to the second mixer when next time the first frequency generator is enabled.

2. The random number generating device as claimed in claim 1, wherein the second frequency generator further comprises:
   a first frequency generating unit, generating and outputting a fourth frequency signal;
   a second frequency generating unit, generating and outputting a fifth frequency signal; and
   a third mixer, input ends of the third mixer are electrically connected to the first frequency generating unit and the second frequency generating unit; an output end of the third mixer is electrically connected to one of the input ends of the first mixer such that the third mixer generates the third frequency signal according to the received fourth frequency signal and the received fifth frequency signal;
   wherein frequency of the fourth frequency signal is higher than frequency of the fifth frequency signal.

3. The random number generating device as claimed in claim 1, wherein a transmission path where the random signal being fed back to the first frequency generating circuit is a positive feedback path.

4. The random number generating device as claimed in claim 1, wherein the random signal generated by feedback is a white noise.

* * * * *